No. 711,353. Patented Oct. 14, 1902.
J. L. SHEPPARD.
COMPRESS FOR COTTON.
(Application filed Mar. 17, 1902.)
(No Model.) 5 Sheets—Sheet 3.

No. 711,353. Patented Oct. 14, 1902.
J. L. SHEPPARD.
COMPRESS FOR COTTON.
(Application filed Mar. 17, 1902.)
(No Model.) 5 Sheets—Sheet 4.

WITNESSES
E. Nottingham
G. F. Downing

INVENTOR
J. L. Sheppard
By H. A. Seymour
Attorney

No. 711,353. Patented Oct. 14, 1902.
J. L. SHEPPARD.
COMPRESS FOR COTTON.
(Application filed Mar. 17, 1902.)
(No Model.) 5 Sheets—Sheet 5.
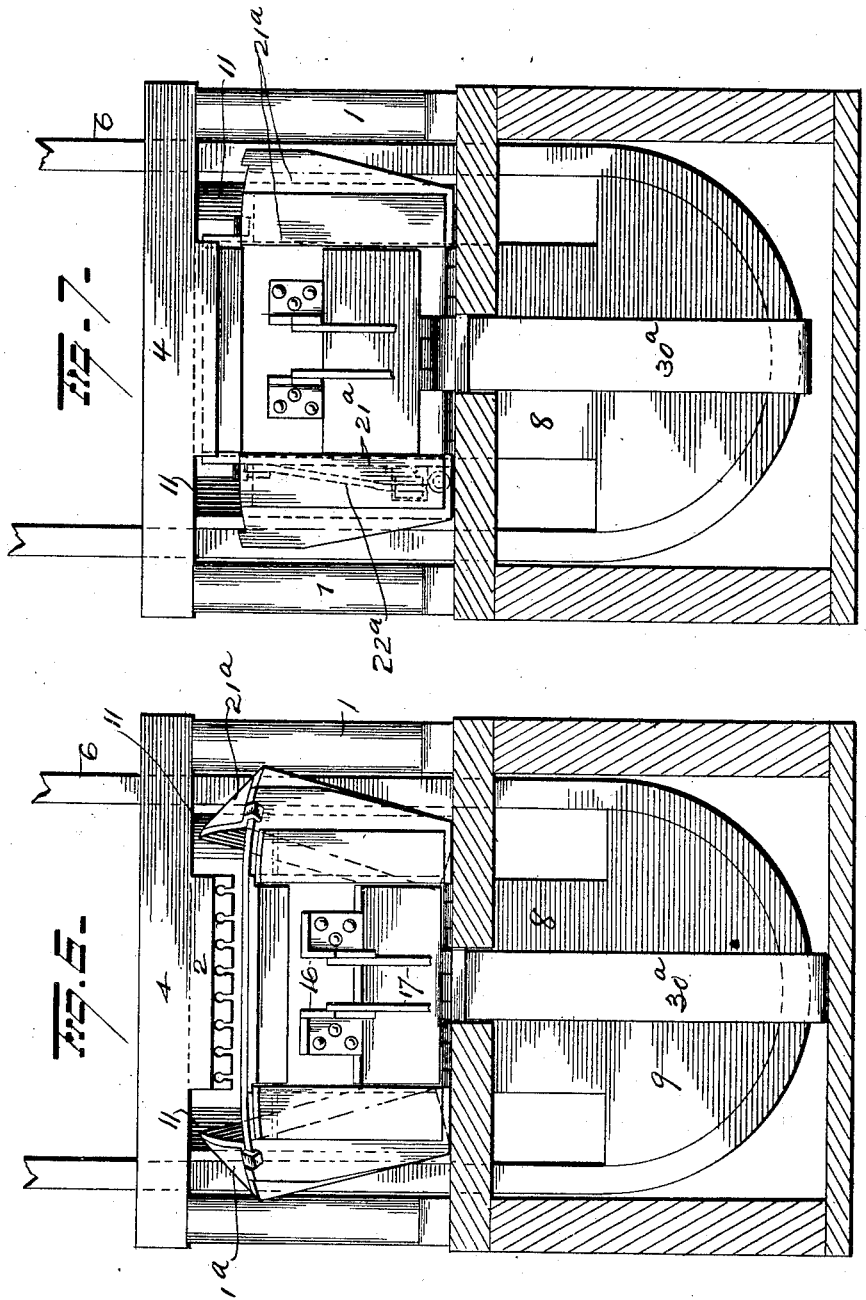

UNITED STATES PATENT OFFICE.

JOHN L. SHEPPARD, OF CHARLESTON, SOUTH CAROLINA.

COMPRESS FOR COTTON.

SPECIFICATION forming part of Letters Patent No. 711,353, dated October 14, 1902.

Application filed March 17, 1902. Serial No. 98,650. (No model.)

*To all whom it may concern:*

Be it known that I, JOHN L. SHEPPARD, of Charleston, in the county of Charleston and State of South Carolina, have invented certain new and useful Improvements in Compresses for Cotton; and I do hereby declare the following to be a full, clear, and exact description of the invention, such as will enable others skilled in the art to which it appertains to make and use the same.

My invention relates to an improvement in compresses for cotton or other bales, the object being to take the ordinary plantation-bale and compress it to standard size and of equal density throughout; and it consists in upper and lower platens and movable gates and end wings adapted to produce sidewise and endwise compression of the bales.

My invention further consists in upper and lower platens, front and rear gates for sustaining the bales against lateral expansion while under compression, and end wings for compressing the bale endwise.

My invention further consists in upper and lower platens, front and rear gates for sustaining the bale against lateral expansion while under compression, and movable end wings carried by the gates and movable in a direction to compress the bale endwise.

My invention further consists in the parts and combinations of parts, as will be more fully described, and pointed out in the claims.

Figure 1:
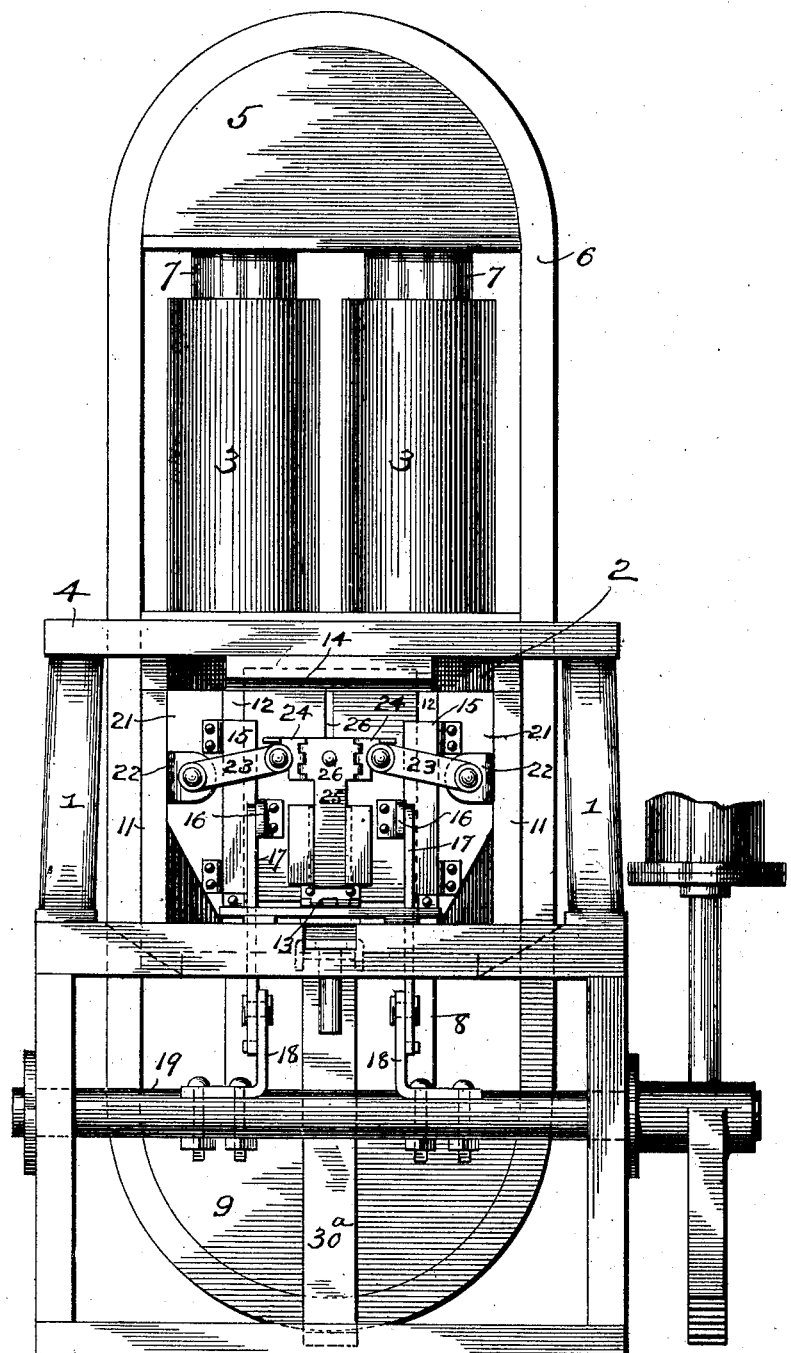
Figure 2:
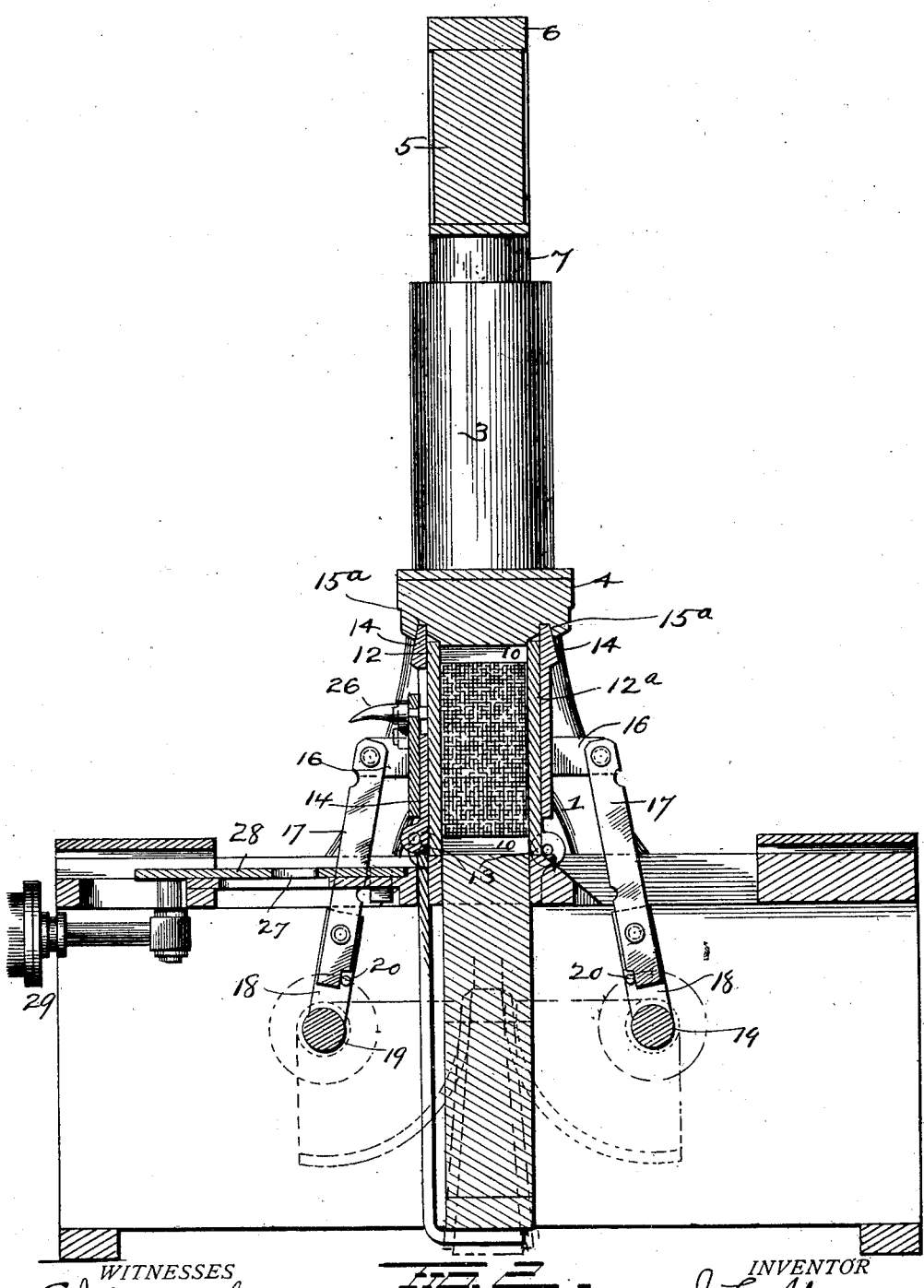
Figure 3:
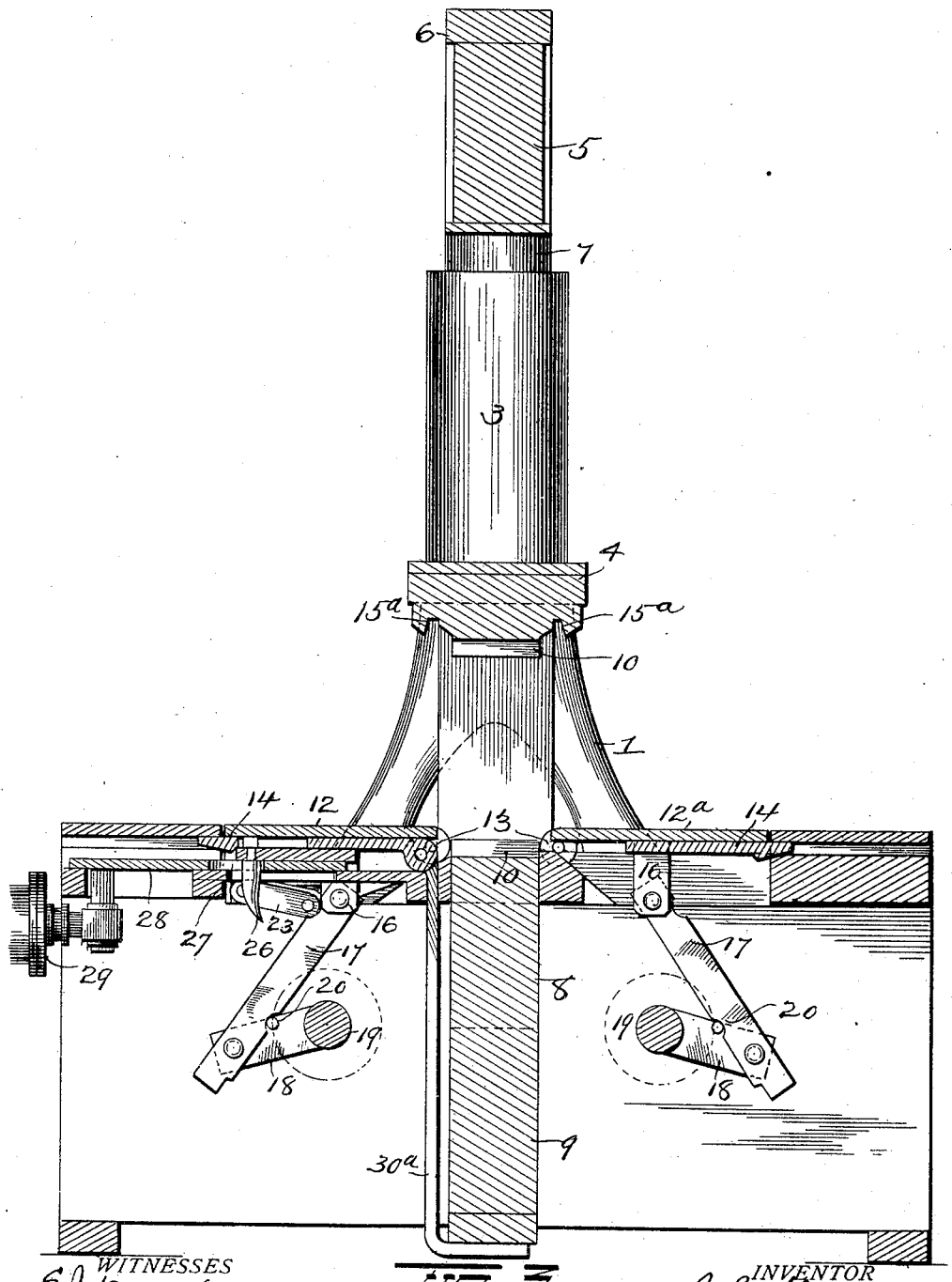
Figure 4:
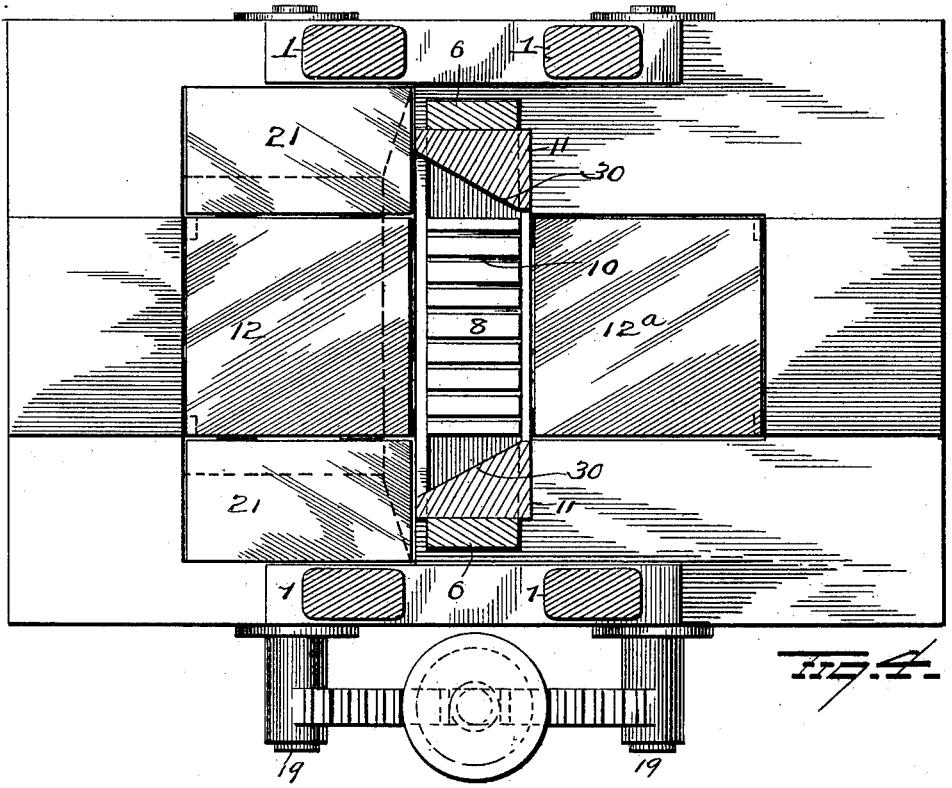
Figure 5:
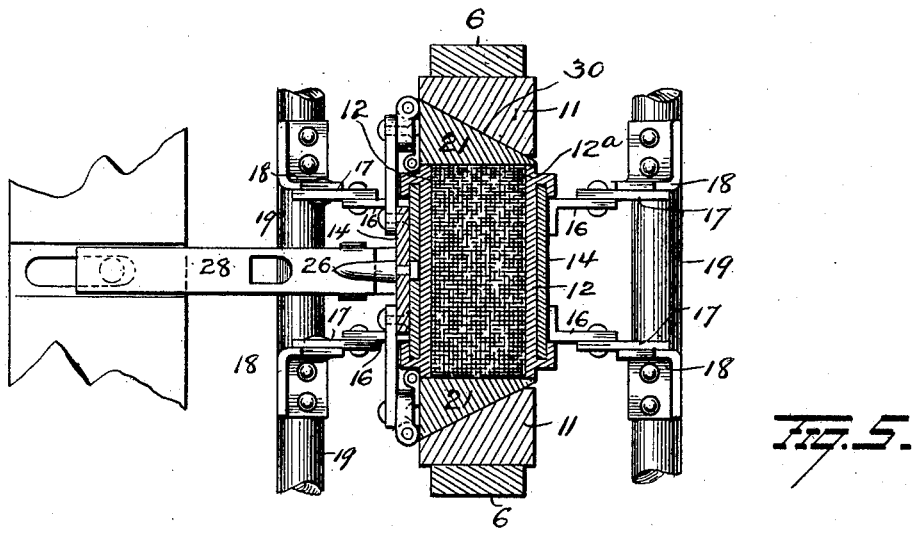

In the accompanying drawings, Figure 1 is a view in elevation of a compress embodying my invention. Fig. 2 is a view in side elevation, partly in section, of same, showing the gates in their closed positions and the bale compressed. Fig. 3 is a similar view showing the gates open. Fig. 4 is a transverse sectional view taken below the upper platen and showing the gates open. Fig. 5 is a detached view of one of the gates, showing the locking mechanism thereon; and Figs. 6 and 7 are views of a modified form of gate carrying sliding wings.

The frame 1 of the press is constructed in any suitable manner to support the upper fixed platen 2. The lower movable platen 8 is operated by one or more steam or hydraulic rams 3, which in the present instance are mounted on the upper face of the cross-beam 4, to the under face of which latter the upper platen 2 is secured. The head 5 of a yoke 6 rests on and is secured to the upper ends of the plungers 7 of the steam or hydraulic rams 3, and the vertical and parallel members of this yoke 6 pass downwardly through slots in cross-beam 4 at opposite ends of the upper platen 2 and are secured at their lower ends to the lower cross-head 9, which carries the movable platen 8. The two platens each have approximately the same surface area and each is provided with slots 10 for the passage of the bands employed in tying the bale after compression. Depending from the upper cross-head and supported against lateral deflection by the upright members of the yoke 6 are the frames 11, which latter extend down to a plane with or below the upper surface of the lower platen when the latter is in its depressed position and form abutments or supports against which the end wings, to be hereinafter referred to, bear when a bale is under compression. The upper face of the lower platen when in its depressed or open position rests in or below the plane of the floor or platform on which the operators stand, so that no elevation of the bale is necessary in feeding the same to the compress, and this lower platen is designed to be lifted by the yoke 6, previously described, and compress the bale between it and the upper platen and also between the front and rear gates and the end wings carried by the gates. The gates 12 and 12ª are somewhat alike in construction and are located on opposite sides of the compress, and are hinged to the suitable supports 13, adjacent to the lower platen, so that when swung out or in open position they lie approximately in a plane with the upper surface of the lower platen when the latter is down and when in their closed position lie well up to said lower platen, sufficient space being, however, between the two gates for the free vertical movement of the lower platen. These gates 12 and 12ª extend up to and overlap the lower edge of the upper platen, so that when the gates are closed they positively prevent any lateral expansion of the bale under compression. Mounted on the outer face of each gate is a sliding bolt 14. Each bolt is in the form of a flat plate, covering the greater part of the surface of the gate, and each is mounted to slide in the guides 15, secured to the outer face of the gate. Each bolt 14 has a lengthwise-sliding movement on its gate and is adapted to be projected, as hereinafter described, above its gate and enter a keeper 15ª, secured to the cross-beam 4 on the outside of the upper platen, and when so projected operates to lock the gates in their closed position. Secured to the outer face of each bolt are the brackets 16, to which are pivoted the pitmen 17, which are connected at their lower ends to the arms 18, fast on shaft 19. The two shafts 19 are located in vertical planes passing respectively in front of and behind the gates and are actuated simultaneously by the mechanism shown for raising and lowering the gates and also for shooting and withdrawing the bolts. The arms 18 are each provided with a lug 20, designed to engage the pitmen below their points of connection with the arms and lock them against further movement immediately after they have passed the dead-center, thus supporting and locking the gates in their closed position and the bolts in their locked position until the shafts 19 are rotated in a direction to drop or open the gates.

As before explained, the brackets 16 are secured to the bolts 14 and the latter are carried by the gates 12 and 12ª. Hence when the shafts are first rotated in a direction to close the gates the latter are turned until their upper ends are in contact with the sides of the upper platen. The continued movements of the shafts 19 operate through the arms 18 and pitmen 17 to force the bolts 14 upwardly, and after the latter have entered their keepers 15ª the arms 18 and pitmen 17 pass the center and hold the bolts in their locked positions. The upper ends of the bolts 14 are thickened and beveled on their outer faces, while the contacting faces of the keepers 15ª are also correspondingly beveled. While I do not limit myself to any particular sizes of parts, I have found that bolts having wedge-shaped ends, each wedge being about four inches thick at its base and one inch at its top, with a length of about six inches, gives excellent results. These wedge-shaped ends not only force the gates home and in close contact with the platens and the cotton-bale between the platens, but they are also of a size and dimensions to permit the wedge to be retained by the keeper in unlocking the bolts until after the compressed bale has expanded laterally, so that the gates will be relieved of all lateral pressure before the wedge ends of the bolts leave the keepers.

Hinged to the sides of the gate 12 at the front side of the compress are the end-compressing wings 21. These wings are triangular in cross-section and are adapted when in their horizontal and open positions to rest flush with the surface of the gate, the platform or floor on the front side of the compress being recessed or cut away, as shown, to receive the gate and its wings and support the latter. The gate and its wings when in their open positions form a continuation of the floor or platform on which the operatives stand while adjusting the bale-bands, the opposite side of the floor being recessed to receive the rear gate 12ª.

Secured to the outer inclined face of each side wing are the hinges 22, one member of each hinge overlapping the base of its wing. Both overlapping or inwardly-extending members of the hinges are pivotally connected to the links 23, and the latter are pivotally connected at their inner ends to the brackets 24, which are hinged to the slide 25, the axis of the pivotal connection of the links to the brackets being at right angles to the axis of the hinge-joint connecting the brackets and slide, so as to permit of the necessary movement of the parts in opening and closing the gates. The slide 25 is mounted in a grooved slideway 26ª in the outer face of the bolt 14, and it is provided with an outwardly-projecting stud 26, which latter when the gate is lowered enters a slot 27 in the sliding arm 28, mounted below the floor or platform and actuated by a suitable steam-cylinder and piston 29. Instead of using a separate sliding arm 28 the piston-rod of cylinder and piston 29 may be constructed to engage stud 26. When the wings are in closed position, their inner faces are at right angles to the inner face of the gate 12, while their outer faces are inclined and their ends adjacent to the compress beveled.

The depending side frames 11, previously referred to, are provided on their inner faces with inclines 30, corresponding to the beveled faces of the wings. Hence it will be seen that if for any reason the wings are prevented from assuming their complete vertical positions before the gate is closed the act of closing the gate will carry the inclined faces of the wings against inclines on the side frame 11, and thus force the wings to their fully-closed position and sustain them in such position while the bale is being compressed.

In the operation of the compress the ordinary plantation-bale is first stripped of a majority of its bands and loaded, either mechanically or by hand, onto the gate 12, carrying the wings. The bale may be longer than the gate is wide, and if so its ends will overlap the side or end wings. The side or end wings are now closed or partly closed by the mechanism previously described, after which the gates are closed and bolted. If the plantation-bale should be longer than the width of the gate, and thus oppose the closing of the wings, the latter would be closed by the wings-closing devices and held so until the beveled ends of the wings were well inside or between the beveled frames 11. At this point the stud 26 would leave the slide 25, and thus release the wings, but the latter would be restrained by the inclines on the frame 11 and be gradually closed by the closing movement of the gate, so that when the gate reaches its closed position the wings will have compressed the plantation-bale endwise. Both gates 12 and 12ª move simultaneously and should be fully closed before the movable platen is elevated, and hence they first reduce the width of the bale to standard width and prevent any lateral spreading of the bale while the end wings are compressing it lengthwise. After the bale has been thus placed within the closed compressing-chamber the movable platen is actuated and the bale fully compressed, after which the gates are released and opened and the bale is tied and removed in the usual manner.

Depending from the bolt 14 is the bracket 30ª, which latter is bent at its lower end and rests in the path of the head 9 of the lower platen 8. When the lower platen is down, the head 9 or the yoke 6, embracing the head, rests on the bent end of bracket and prevents the bolt from rising. Hence it will be seen that before the gates can be locked by the bolts 14 it is essential that the lower platen be slightly elevated. Consequently in the operation of the compress the gates are first closed and held so by the mechanism actuated by the shafts 19. While the gates 12 and 12ª are thus closed, the lower platen begins to ascend, thus releasing the bracket 30ª and permitting the shafts 19 to complete their movements and lock the gates.

The modified construction shown in Figs. 6 and 7 is substantially like that previously described, except that the end wings 21ª instead of being constructed to open and close are pivoted at their lower ends to the gate, while their upper ends are normally held outwardly away from each other by springs 22ª. With such construction the space between the upper ends of the wings is ample in size to receive the largest size plantation-bale, and the act of closing the gate operates to compress the bale lengthwise to standard size. With this modified form the inner ends of the wings always rest within the planes of inclines on the side frames 11. Hence the closure of the side wings is accomplished solely by the contacting inclined faces and without the employment of the engine disclosed in the other form.

It is evident that many slight changes might be resorted to in the relative arrangement of parts herein shown and described without departing from the spirit and scope of my invention. Hence I would have it understood that I not wish to restrict myself to the exact construction and arrangement of parts herein shown and described; but, Having fully described my invention, what I claim as new, and desire to secure by Letters Patent, is—

1. The combination with upper and lower platens, of front and rear gates for preventing lateral expansion of the bale, and end wings for producing endwise compression.

2. The combination with upper and lower platens, of front and rear gates for preventing lateral expansion of the bale and movable end wings carried by one of the gates, and adapted to sustain the bale endwise during compression.

3. The combination with upper and lower platens, of front and rear gates, mechanism for closing and opening same, wedge-shaped end wings forming end supports for the bale, and means for moving said wings inwardly.

4. The combination with upper and lower platens, of front and rear gates, mechanism for closing and opening same, wedge-shaped end wings carried by one of said gates, and depending side frames each having a beveled inner face against which the end wings bear.

5. The combination with upper and lower platens, of front and rear gates, mechanism for simultaneously closing and opening same, movable end wings carried by the gates, bolts mounted on the gates and keepers to be engaged by said bolts when the gates are thrown to a closed position.

6. The combination with upper and lower platens, of front and rear gates, means for closing and opening same, a movable bolt on each gate, a keeper adapted to be engaged by each bolt for holding the gates in their closed positions, and devices coöperating with the gate-operating means for operating the bolts.

7. The combination with upper and lower platens, of two hinged gates, a bolt on each gate and mechanism for actuating the gates and for shooting and withdrawing the bolts.

8. The combination with upper and lower platens, of two hinged gates, a bolt on each gate, the said bolts having wedge-shaped locking ends, a keeper adapted to be engaged by each bolt, and means for sliding the bolts endwise, to lock and unlock the gates.

9. The combination with upper and lower platens, of two hinged gates, a sliding bolt on each gate, each bolt having a wedge-shaped locking end, a keeper adapted to be engaged by each bolt, and means connected with the bolt for first closing the gates and then shooting the bolts.

10. The combination with the platens of a compress, of front and rear gates, one gate having two hinged end wings, means for opening and closing said hinged wings, and means for closing both gates.

11. The combination with the platens of a compress, of front and rear gates, a sliding bolt on each gate, and hinged wings on one gate, means for closing and opening the gates, and independent means for closing and opening the wings.

12. The combination with the platens of a compress, of movable gates forming the front and rear of the compress-box and movable end wings carried by one of said gates and forming ends of the compress-box.

13. The combination of the platens of a compress, of hinged gates, a sliding bolt for each gate, end wings hinged to one gate, means for closing and opening said wings, and independent means for actuating both gates and the bolts thereon.

14. The combination with the platens of a compress and beveled side frames, of hinged gates each carrying a sliding bolt, means for closing and opening said gates, and end wings carried by one of said gates and having inclined or beveled outer faces to engage the beveled side frames.

15. The combination with the platens of a compress, and beveled side frames, of hinged gates each carrying a bolt, and wings hinged to one of said gates and having beveled outer faces to correspond with the beveled faces of the side frames, means for closing said end wings before the gates are actuated, and means for closing both gates.

In testimony whereof I have signed this specification in the presence of two subscribing witnesses.

JOHN L. SHEPPARD.

Witnesses:
MARGARET H. SHEPPARD,
JOHN A. WHITE.